United States Patent Office 3,425,194
Patented Feb. 4, 1969

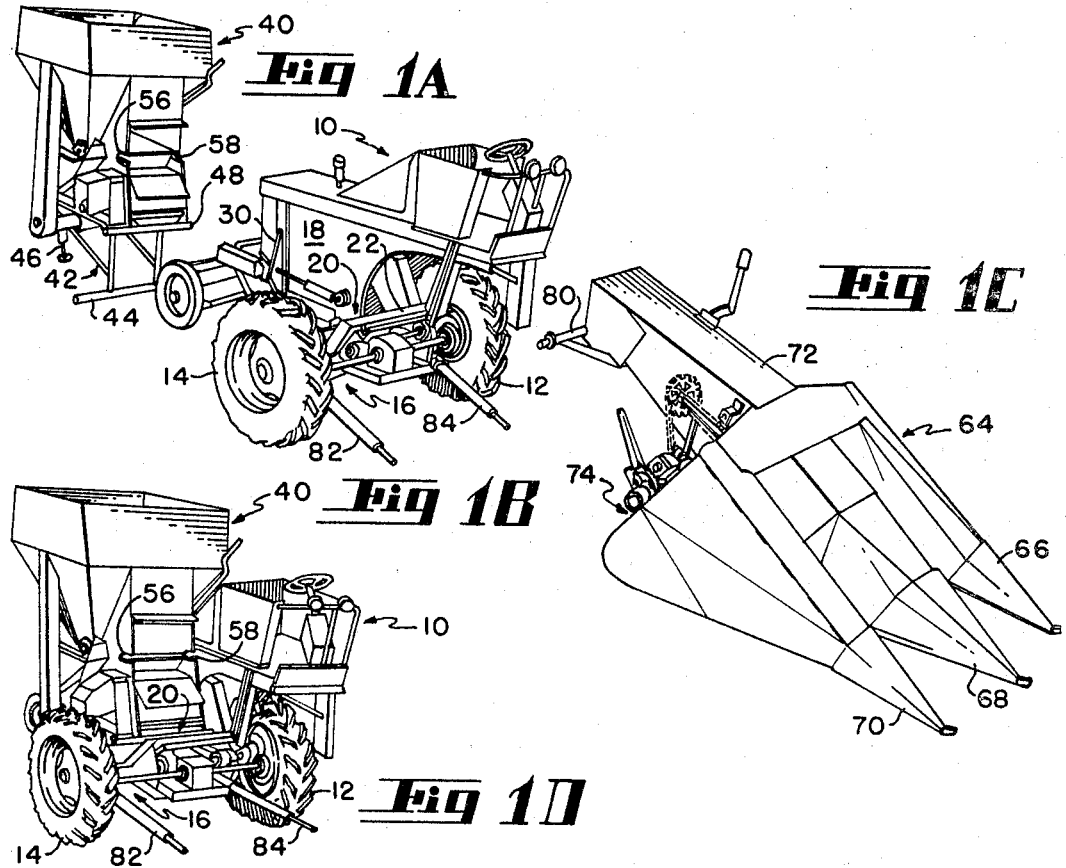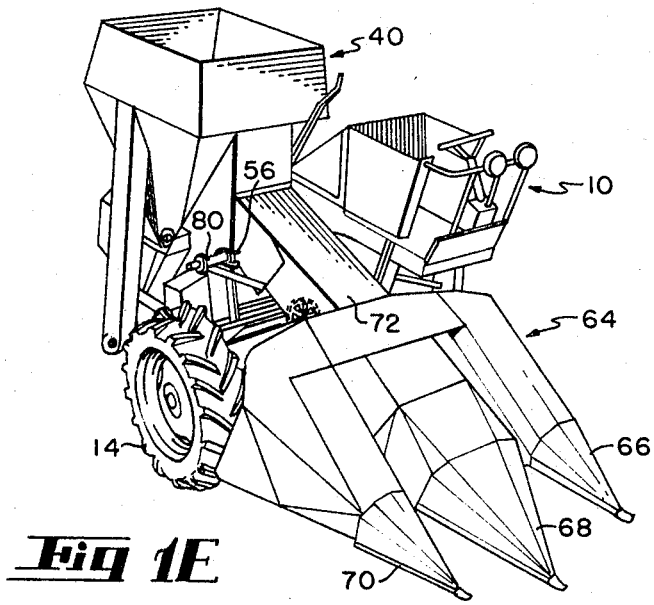
INVENTORS.
TED STOTT
LYMAN J. GUNYOU
GEORGE V. FRUSHOUR
WILBUR E. GROENEVELD
ATTORNEYS.

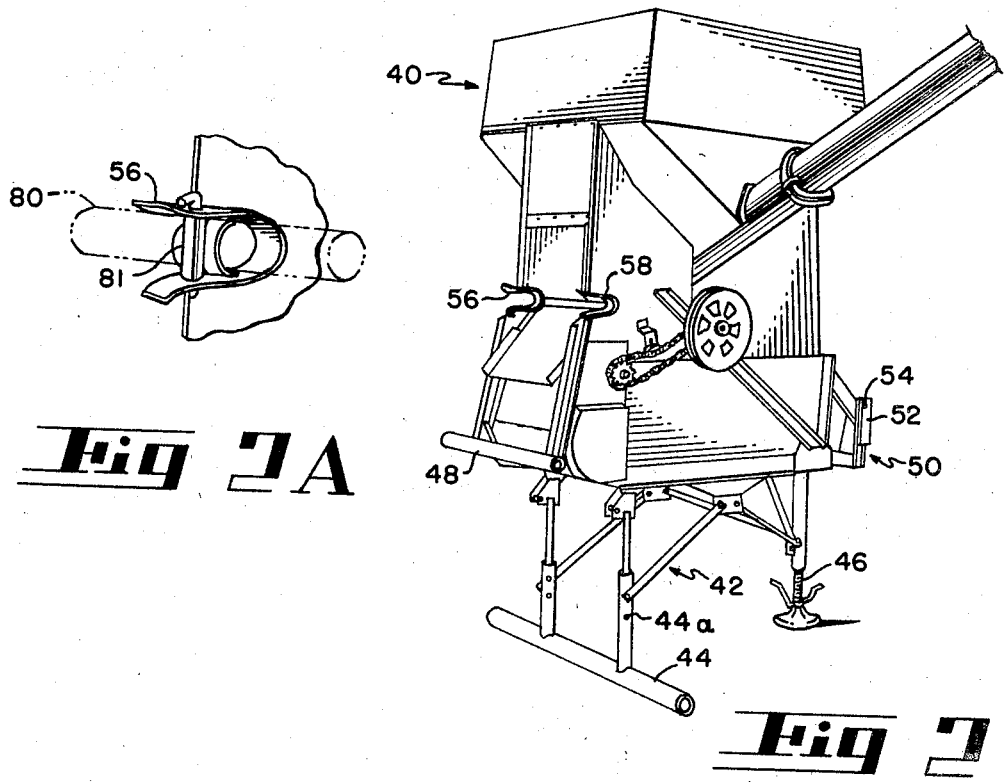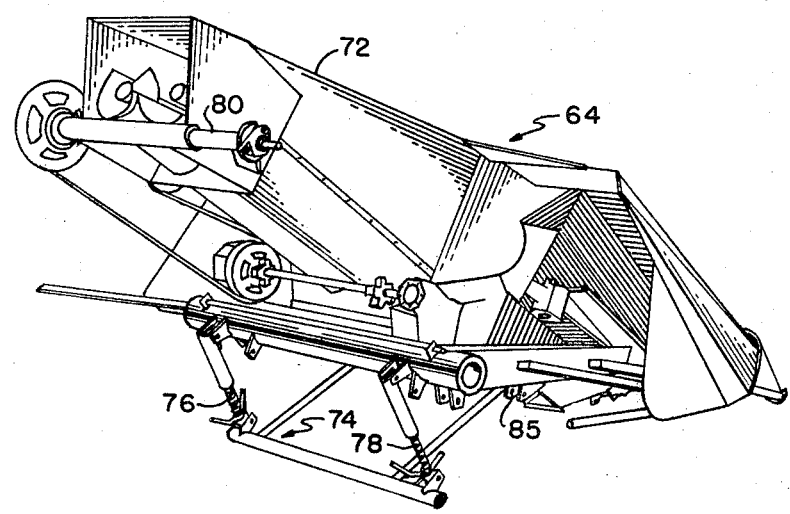

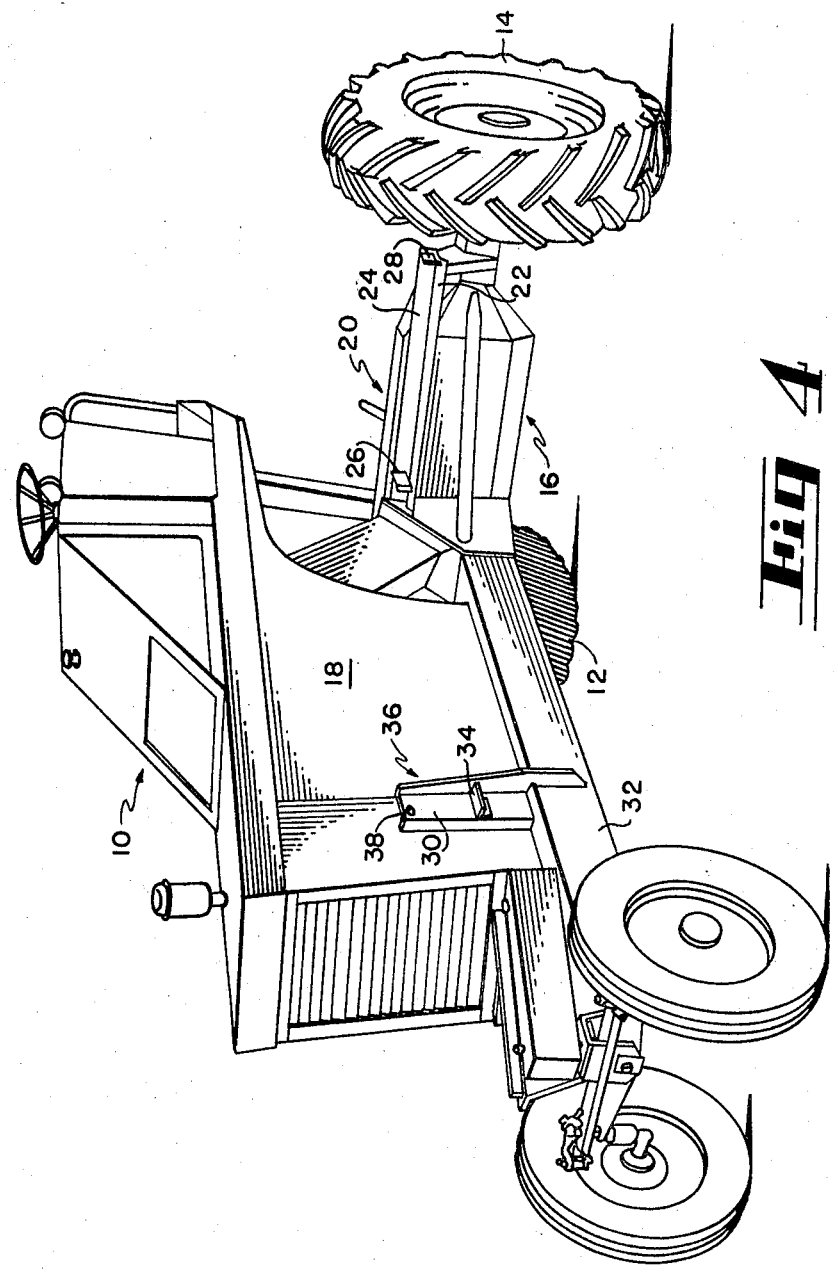

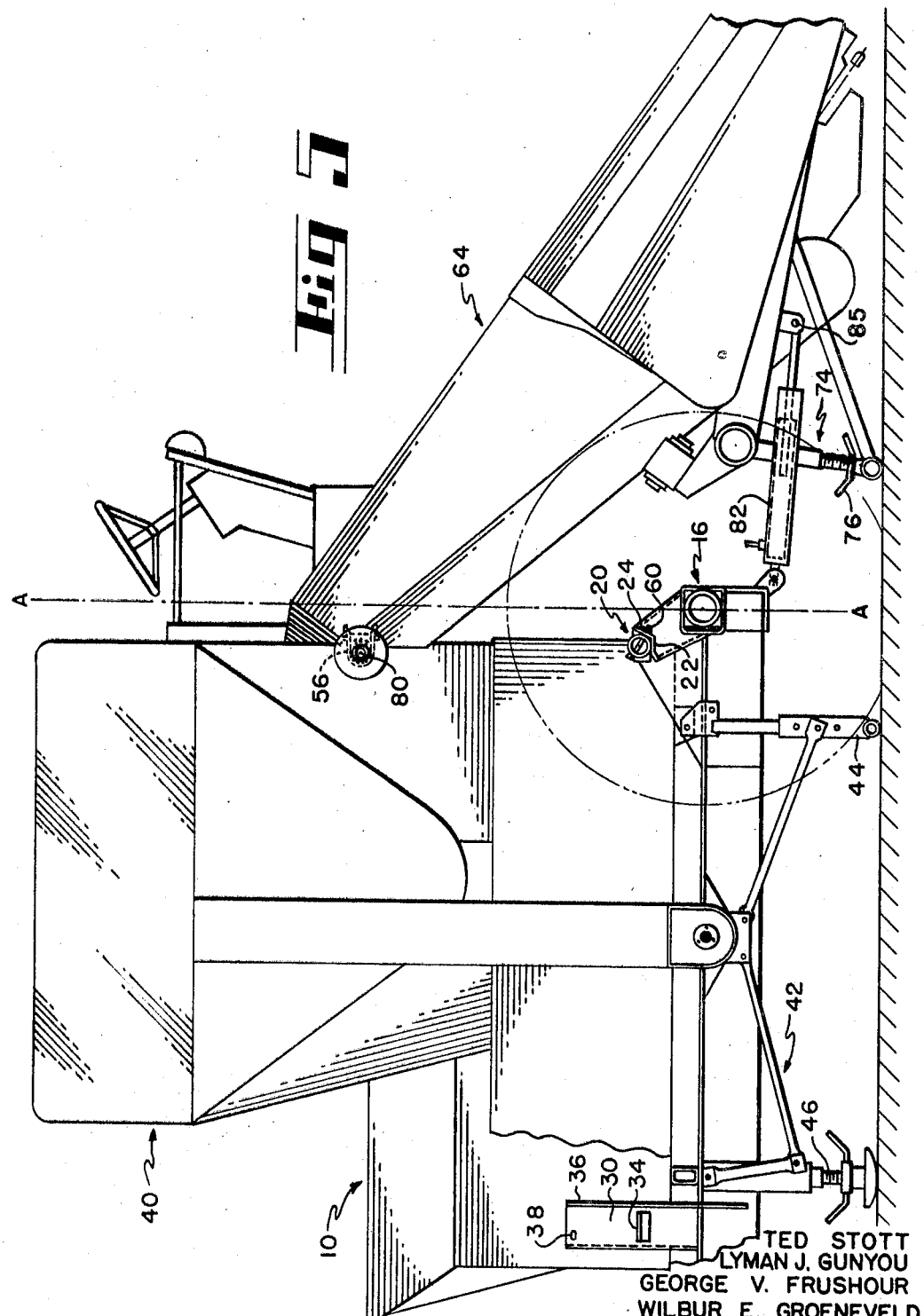

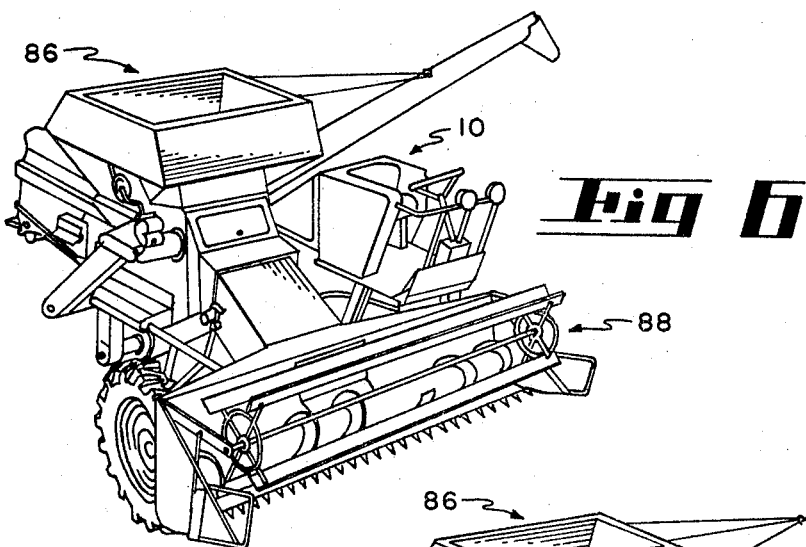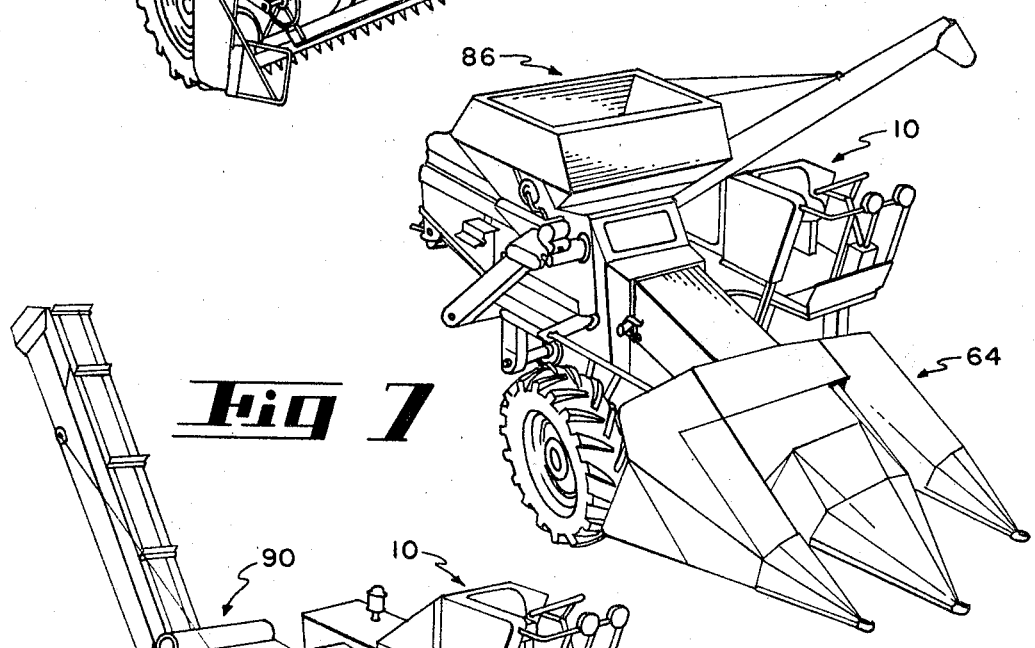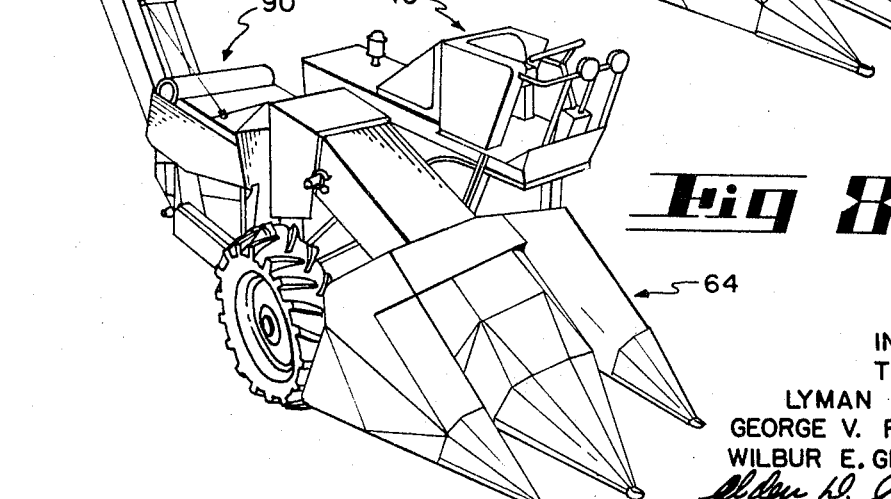
INVENTORS.
TED STOTT
LYMAN J. GUNYOU
GEORGE V. FRUSHOUR
WILBUR E. GROENEVELD
ATTORNEYS.

3,425,194
SELF-PROPELLED IMPLEMENT ASSEMBLIES
Ted Stott, Lyman J. Gunyou, George V. Frushour, and Wilbur E. Groeneveld, Celina, Ohio, assignors to Avco Corporation, Coldwater, Ohio, a corporation of Delaware
Filed Oct. 20, 1965, Ser. No. 498,933
U.S. Cl. 56—15   7 Claims
Int. Cl. A01d 45/02; A01b 51/02

ABSTRACT OF THE DISCLOSURE

A maneuverable, self-propelled power plant assembly with laterally projecting carrier with offset spaced drive wheels is provided with means to connect a rearward section and a forward section of an implement to the projecting carrier. The connections afford an upwardly open connector above the carrier to which the front end of the rear section is connected with an additional connection at the rear of the rear section with a mating connector at the side of the power plant assembly. The forward section, generally including a crop gathering unit, is connected to the assembled rear section by a pivotal connection, located adjacent a vertical plane through the carrier at a position above the carrier and a stable connection is completed by an hydraulically operable, variable length connecting means extending between the forward section and the carrier which also supplies an operating adjustment of the gathering mechanism.

---

This invention relates to self-propelled implement assemblies wherein improved means are provided to mount, selectively as desired, a plurality of implements of varying function on a common self-propelled power unit.

It is a principal object to provide a mechanism wherein farm implements, or parts thereof, may be assembled for carriage on, and be driven by, a self-propelled power unit by the provision of improved means of connection and assembly, including the moving of the self-propelled power unit in close proximity to the implement with means to position cooperating connections in position for completion of a carrying connection.

In accomplishing this purpose, implements are divided into forward portions and rearward portions designed to be supported on a laterally extending carrier member of a tractor with connecting means to each of the portions with separation and connection accomplished in the region above said carrier. Thus a rearward portion may be first connected and supported by said carrier and then moved with said tractor into position to connect and to support a selected forward portion.

It is a further object to provide forward and rear portions with integral adjustable jack means such that said forward and rear portions may be ground supported and cooperating connections between the carrier and the forward and rear implement portions may be aligned to provide facility of connection.

It is a further object to provide the forward unit, generally a crop gathering unit, with hydraulically operable variable link connecting means between the forward crop gathering unit and the carrier to complete the support from the carrier and to afford operating adjustment of the forward gathering unit about the connecting pivot means, which serves both as a support connection and a pivot for adjusting the gathering means.

It is a further object to provide a forward unit crop gathering portion of an implement which is adaptable to be used in common with a plurality of rearward implement portions which may be selectively mounted on the projecting carrier of the self-propelled tractor. A specific assembly of such mechanisms is the provision of a multi-row corn-snapping gathering unit, known generally in the trade as a corn head, and such corn head being the forward implement portion and provided with a pivotal connecting means which can be used in common with several corn treating implements, all adapted to be supported on the extending carrier as a rearward portion of the implement generally designated in this invention. Such treating units for illustration in the corn harvesting devices are a corn sheller, a corn husker, and a corn grinder. All of these crop treating units could be used in common with the single front gathering unit which would be equally capable of pivotal support and having its support completed by hydraulic cylinder connections from the projecting carrier member of the tractor, and the pivoting effecting support and adjustment being carried on the rearward unit and connections being made adjacent the separation plane of the gathering unit and the crop treating unit, as previously noted.

It is also possible with this arrangement of projecting carrier on a power unit to have a single rear implement portion such as a combined, so-called grain separating device, capable of corn shelling and also capable of threshing and separating small grains such as wheat, oats and barley, and this rearward unit would be a single unit to which might be attached selectively any one of a plurality of gatherng units, an illustration being a corn head capable of picking up ears of corn from the stalk and forwarding snapped ears to the so-called combine separator for combine shelling. Another illustration is selectively mounting a so-called grain platform type of gathering unit capable of cutting stalks of small grain and feeding such crop material into the combine separator for threshing and separating the grain from the straw, as is common in such devices.

It is also a concept that the connections, and relative locations thereof, are of such uniformity that several rearward portions may be provided, as well as several forward portions, so that any one combination of these forward and rearward portions with its distinct combined functions may be selectively connected and supported on the tractor. It is the specific selection in several classes of implements that the forward portions provide crop gathering and severing functions, such as either the sickle bar cutting, transfer and feeding function, or the so-called row crop gathering and feeding function in another forward portion. It is also within the concept that a forward portion might complete a crop treatment with the rearward portion merely affording a support connection to the carrier.

The importance of the improved arrangement is to provide for simplicity and ease of assembly and disassembly of these several units by first moving the tractor power unit into a rearward unit and mounting that unit on the carrier of the tractor power unit and subsequently moving the mounted assembly carrying the rearward unit into position to be easily and quickly assembled to the forward implement portion.

It is important that the improvement afforded by this invention makes possible and practical the use of one self-propelled power unit, a very expensive part of any implement, usable in common with a great number of implements, all selectively usable and easily and quickly mounted on this single self-propelled unit in combinations as may be desired.

The above and other objects of the invention will be further evidenced by the description of a specific disclosure of mechanism found practical in actual operation and by reference to the accompanying drawings, wherein:

FIGURE 1-A is a perspective view of a rearward implement unit, specifically a corn sheller, showing the unit ground supported on jack means ready for assembly;

FIGURE 1-B is a perspective view of self-propelled power unit with laterally extending axle assembly, serving as a carrier, in position ready to bring the supporting brackets of the carrier and power unit assembly into mounting engagement with the mounting brackets of the rearward sheller unit shown in FIGURE 1-A;

FIGURE 1-C is a perspective view of a forward implement unit, specifically a two-row crop-gathering unit, mounted on jack support means in position on the ground in proper alignment for mounting to the rearward sheller unit when the sheller unit is carried in mounted position by the power unit on subsequent forward movement of the power unit when carrying the mounted sheller unit;

FIGURE 1-D shows the rearward sheller unit mounted on the carrier of the power unit;

FIGURE 1-E shows both the rearward sheller unit and the forward crop-gathering unit mounted on the power unit;

FIGURE 2 is a perspective front view of the rearward sheller unit showing the front support tube mounting bracket, as well as the rear support bracket for accomplishing the attachment of the rearward sheller unit to the carrier of the power unit. The jack means for supporting the rearward sheller unit on the ground in proper position for completing the connection to the power unit is also shown;

FIGURE 2-A is a diagrammatic view showing the detail of the connection accomplished by one of the two U-shaped brackets for supporting the forward gathering unit;

FIGURE 3 is a perspective view showing the forward gathering unit with its mounting means including the U-shaft assembly providing a pivot connection, as well as the jack means providing ground support for the forward gathering unit in position to be connected to the mounting brackets of the rearward sheller unit when carried on the power unit;

FIGURE 4 is a perspective view of the power unit including the laterally extending carrier or axle assembly, together with the trough-shaped mounting bracket above the axle, as well as the rear mounting bracket to complete the support of the rearward sheller unit alongside the tractor and over the laterally extending axle or carrier;

FIGURE 5 is a side view, partly in section, showing the relative position of the several points of support, including the troughlike support above the axle, the U-shaped bracket connection between the gathering unit and the sheller unit, as well as the rear mounting bracket which completes the connection of the sheller unit alongside the power unit. This view shows the power unit, the rearward sheller unit and the front gathering unit in position together with the location of the several mounting means;

FIGURE 6 is a perspective front view of a grain combine made up of a grain separator as the rearward unit and a platform sickle-type gathering unit as the forward unit mounted on the power unit.

FIGURE 7 is a perspective front view of the combine type of rearward unit shown in FIGURE 6, but with a forward unit of the two-row corn head type mounted thereon, thus completing the assembly of such a unit on the power unit;

FIGURE 8 is a perspective front view of a corn husker type of rearward unit mounted on the power unit, together with a two-row gathering unit as the forward unit, thereby affording a unit with ability to snap and husk corn from standing rows thereof.

Referring to the drawings, FIGURE 1-B shows a self-propelled power unit 10 with spaced drive wheels 12 and 14 connected by a drive axle carrier assembly 16. This carrier assembly 16 is laterally projecting from the longitudinally positioned power plant assembly 18 of the power unit 10. Referring also to FIGURE 4, a trough-shaped support bracket 20 is shown mounted on the axle carrier assembly 16, the trough-shaped bracket extending in a region substantially parallel to and above the axle carrier 16 and, as shown particularly in FIGURE 4, has a ledge portion 22, an abutment portion 24, an end guide members 26, 28 defining the ends of said support bracket 20.

On the longitudinally extending power plant assembly 18 of the power unit 10 there is a rear support bracket 36 (see FIGURE 4). This bracket 36 is supported on the frame 32 of the power plant 18. The bracket affords a horizontal support surface 34, a vertical support surface 30, and a hole 38 for a securing means. It is noted that the bracket 36 is positioned substantially rearward of the axle carrier 16 and is offset to one side and rearward of the trough-shaped support bracket 20.

FIGURE 1-A shows a rearward unit 40, here illustrated as a corn sheller. This rearward unit 40 is shown ground supported by stand assembly 42, the front portion 44 of which contacts the ground and has height adjustment (see 44a, FIG. 2). The rear adjustable support portion 46 supports the rear of the unit 40 and provides for adjustment in a vertical direction so that a laterally extending support tube 48 may be given vertical adjustment as to position it relative to the ground by the adjustment of the rear jack portion 46.

The aforesaid elements 42, 44, 46, 48 are also shown in FIGURE 2, which is a perspective view of the rearward unit 40 showing the opposite side thereof from that shown in FIGURE 1-A and where is appears that there is provided at the lower right side, as shown in FIGURE 2, a support bracket 50 affording a flat vertical support surface 52 with a hole 54 for completing a connection with bracket 36 (see FIGURES 1-B and 4).

It also appears, in both FIGURES 1-A and 2, that U-shaped brackets 56, 58 are provided at the front portion of the rearward unit 40, which U-shaped brackets are open at the forward end.

With the rearward unit 40 supported by the jack assembly 42, substantially in the position shown in FIGURE 1-A, the power unit 10 may be moved under power to the left, as shown in FIGURES 1-A and 1-B, into position to bring the trough-shaped support bracket 20 of the power unit with its ledge portion 22 into contact with and in support relationship to the support tube 48 of the rearward unit 40, the positioning of such tube 48 in support position being guided by the end guide members 26, 28, and further positioned by the abutment portion 24. At the same time, the rear support bracket 36 on the power unit moves into position so that its horizontal support surface 34 and its vertical support surface 30 and the surface of said bracket contact the support bracket 50 (see FIGURE 2) rearward of unit 40, and the hole 38 in the power unit rear bracket 36 will be in alignment with the hole 54 in the rearward unit bracket 50 and can be secured thereto by suitable bolt connections and is also vertically supported on the horizontal support surface 34 of the power unit bracket 36. Positive connection of the support tube 48 in the trough-shaped support bracket 20 is completed by bolt connections 60.

FIGURE 1-D shows the rearward unit 40 supported on the power unit 10 by the means above described. It is noted that this unit, thus supported on the power unit, makes a mobile assembly capable of movement with the power unit and the next step is the assembly of this unit to a forward unit 64, shown in FIGURES 1-C, 1-E and 3. The forward unit 64, illustrated, is a two-row corn-snapping unit capable of straddling two adjacent rows of corn by the dividers 66, 68 and 70 and by corn snapping mechanism (not here illustrated in detail) snaps the ears of corn from the stalks and elevates them upward into an elevator 72 for feeding to the rearward unit 40, here illustrated as a corn sheller. This forward unit 64 is provided, as shown in FIGURE 3, with a jack assembly 74 having adjustable vertical members 76, 78, thereby affording an adjustable positioning of the forward unit 64 from the ground in a manner similar to that provided for the rearward unit 40. With this gathering unit thus positioned, as shown in FIGURES 1–C and 3, the assembled power unit 10 and rearward unit 40 (FIGURE 1–D) may be moved forward into position such that the tube assembly 80, projecting laterally from the elevator 72, completes a pivot connection by movement of the shaft into the open ends of the U-shaped brackets 56, 58 of the rearward unit 40, thus providing a pivotal support for the forward unit 64 on the rearward unit 40. The assembly of the pivot shaft 80 into each of the U-shaped brackets 56, 58 is completed by the use of a pin connector 81 in the forward portion of each of the U-shaped brackets, thus completing the pivot connection (see FIGURE 2–A).

The axle carrier assembly 16, as shown in FIGURES 1–B, 1–D and 5, is provided with hydraulic cylinders 82, 84, pivotally connected at the inner ends to the axle carrier assembly 16 and with outer ends provided with pivot connections which can be connected to brackets 85 on the under side of the forward unit 64, such brackets being shown in FIGURE 3. Thus the forward unit is supported primarily on the U-shaped brackets 56, 58 of the rearward unit 40, but with the connection completed by the hydraulic units 82, 84 from the axle carrier assembly 16. It is to be understood that hydraulic connections to the hydraulic cylinders 82, 84 provide for elongation of such cylinders to adjust forward unit 64 (here a gathering unit) in a vertical direction about the pivot formed by the shaft 80 in the U-shaped brackets 56, 58. There is therefore a combination of vertical adjustment of the unit and the support thereof on the rearward unit 40 and the axle carrier 16.

It is noted that the forward and rearward implement portions separate in a region above the axle carrier and in the illustrative structure near a laterally extending vertical plane through the axle carrier 16 and that the connecting means on the carrier connecting to the rearward portion, as well as connecting means connecting the forward portion to the rearward portion, and the additional hydraulic connection of the forward portion to the carrier, are all in a region near such vertical plane through the carrier. Line A—A in FIGURE 5 shows the approximate fore and aft location of this plane.

FIGURE 1–E shows the rearward unit 40 and the forward unit 64 assembled to the power unit 10 by the means above described.

The assembly of the power unit 10 to the illustrated rearward unit 40 (a sheller) and the illustrated forward unit 64 (a two-row corn head) is one combination of units which is capable of assembly on the power unit 10. There are provided, however, as shown in FIGURES 6, 7 and 8, various combinations of rearward crop treating units and forward gathering units. As an illustration, FIGURE 6 shows a combine made up of a cylinder-type threshing assembly rearward unit 86 assembled on the same power unit 10 with a platform-type sickle-bar gathering forward unit 88. In this case the thresher-type rearward unit 86 and the platform sickle-bar-type gathering forward unit 88 are provided with uniform support connections having relative positions and structure corresponding to the connections 48, 50, 56, 58 (FIGURE 2), 80, 82, 84, 85 (FIGURES 1–C and 3), of the previously described sheller rearward unit 40 and gathering forward unit 64. Likewise, as shown in FIGURE 7, the combine-type rearward unit 86 is shown assembled to the power unit 10 in combination with the previously described two-row gathering forward unit 64 and it is also true on these units that the relative positioning and structure of the several connections 48, 50, 56, 58, 80, 82, 84, 85, are likewise uniform for this combination. As a further illustration, FIGURE 8 provides a rearward unit in the form of a husker assembly 90 combined with and supported on the power unit 10 with the same two-row gathering forward unit 64. Likewise, the connections 48, 50, 56, 58, 80, 82, 84, 85, are uniform on the husker assembly 90 and the gathering unit 64 to complete the same type of connection to the power unit 10 for this combination. It is contemplated that in addition to these structures it will be possible to provide other combinations of rearward and forward gathering units, by retaining the relative positioning of the connecting means. It is also important to consider that each of the processing units and gathering units will also retain an equivalent mechanism for positioning these units for adjustable support on the ground, namely, a jack assembly 42 for the rearward unit and jack assembly 74 for the forward unit.

The side view, shown partly in section in FIGURE 5, includes the assembly of the sheller crop treating rearward unit 40, the gathering forward unit 64 and the power unit 10, with particular emphasis on the location of the several supports for these three units. The relative positioning of the mounting units represented by the element numbers 56, 58, 20, 30 (FIG. 5), and 50 (FIG. 2), are uniform relative to each other on the several units to be selectively assembled to the power unit. The rearward sheller 40 and the forward gathering unit 64 are primarily illustrated. However, the FIGURES 6, 7 and 8 show additional units, as above described. The fact that the forward gathering unit 64 may be assembled on several rearward units is illustrated by FIGURES 7 and 8, as well as the primary assembly shown in FIGURE 1–E. In other words, it appears by reference to these figures that the same two-row gathering forward unit 64 may be selectively assembled to a sheller 40, a threshing assembly 86, or a husker 90.

Although the invention has been described by reference to a specific structure found practical in actual operation, it is nevertheless intended that modifications will be made within the scope of the following claims.

We claim:

1. A self-propelled implement assembly comprising:
 a longitudinally extending maneuverable power plant frame assembly;
 a drive axle carrier assembly supported on and projecting laterally from said power plant frame assembly;
 spaced drive wheels on said axle one at the inner end and the other at the outer end of said projecting carrier;
 an implement;
 a rear section of said implement;
 a forward section of said implement;
 means to support said rear and forward sections of said implement on said laterally projecting carrier between said drive wheels adjacent one side of said power plant frame assembly, said means comprising:
 an upwardly open support bracket positioned and supported above said carrier and extending between said wheels;
 cooperating connections on said rear section and said upwardly open support bracket positioned to support the front end of said rear section on said carrier;
 a rear support bracket mounted on said power plant frame assembly rearward of said carrier;
 cooperating connections on the side of said rear section adjacent said rear support bracket positioned to complete a support of said rear section on said power plant frame assembly;
 upper pivotal connecting means on the front of said rear section positioned above said upwardly open support bracket adjacent a laterally extending, vertical plane through said carrier and said upwardly open support bracket;
 cooperating pivotal connetcing means on said forward section positioned to connect with said upper pivotal connecting means on said rear section thereby to pivotally support said forward section on said rear section;
 hydraulically operable, variable length connecting means extending between said forward section and said carrier completing the support of said forward section and affording an operating adjustment of said forward section relative to said rear section.

2. Mechanism as in claim 1 in which said forward section incorporates a crop gathering mechanism and wherein said hydraulically operable, variable length connecting means both completes a support for said forward section and said gathering mechanism and affords operating adjustment of said gathering mechanism.

3. Mechanism as in claim 1 in which said upwardly open support bracket supported on said carrier is of trough shape, and in which said cooperating connections on said rear section for front end support includes a member of tubular form to fit into said trough shape of said support bracket on said carrier.

4. Mechanism as in claim 1 wherein said rear section and said forward section are each provided with adjustable jack means for separate ground support;
said jack means on each of said sections so constructed and arranged that said rear section and said forward section may be so positioned and aligned by adjustment of said jack means relative to said carrier so that said power plant assembly may be first moved into position for connection to support said rear section on said carrier, and subsequently with said rear section mounted on said carrier, to move said power plant assembly into aligned position adjacent ground supported forward section in position to complete connection of said implement on said carrier.

5. A self-propelled implement assembly comprising:
a self-propelled maneuverable power unit;
an implement;
a rear implement section and a forward implement section adapted for assembly on said power unit;
a laterally extending wheel axle assembly forming an implement support on said power unit;
cooperating connections on said laterally extending wheel axle and said rear and forward implement sections so constructed and arranged that
said rear implement section is first connected and supported from said wheel axle of said power unit by maneuvering said power unit into position to complete connections therebetween
and said forward implement section is connected with said rear implement section and said wheel axle on forward movement of said power unit carrying said rear implement section by maneuvering said power unit and said carrier rear implement section into position to be so connected.

6. The implement assembly according to claim 5 in which said forward implement section incorporates a crop gathering mechanism and wherein the said cooperating connections include hydraulically operable variable length connecting means extending between said forward implement section and said wheel axle, completing the support of said forward implement section and said gathering mechanism and affording operating adjustment of said gathering mechanism.

7. The implement assembly according to claim 5 wherein:
cooperating connecting means on said rearward implement section are provided positioned to complete a support connection with cooperating connecting means on said wheel axle in a region near a vertical plane through said axle and above said axle;
connecting pivotal support means also on said rearward portion also in the region near said vertical plane;
cooperating pivotal connecting means on said forward implement section positioned to connect with said pivotal support means on said rearward implement section;
thereby to pivotally support said forward section portion on said rearward implement section when carried on said axle by said self-propelled power unit.

References Cited

UNITED STATES PATENTS

| Re. 22,279 | 3/1943 | Hyman et al. | |
|---|---|---|---|
| 2,662,459 | 12/1953 | Shore | 172—273 |
| 2,763,976 | 9/1956 | Kenjoski | 56—2 X |
| 2,971,590 | 2/1961 | Andrews | 172—273 |
| 3,320,730 | 5/1967 | Barkstrom et al. | 56—15 |
| 3,324,637 | 6/1967 | Ashton et al. | 56—2 |

LUCIE H. LAUDENSLAGER, *Primary Examiner.*

U.S. Cl. X.R.

56—2; 172—273